Jan. 20, 1953  J. A. PETRIE  2,625,790
ROTARY FLUID MACHINE ASSEMBLY
Filed Oct. 20, 1949
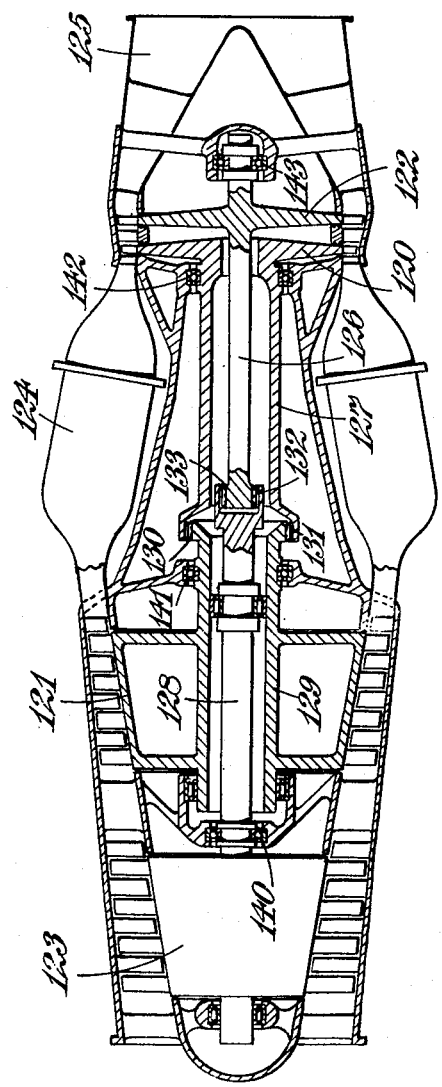
INVENTOR
JAMES A. PETRIE
by Wilkinson Mawhinney
Attys.

Patented Jan. 20, 1953

2,625,790

UNITED STATES PATENT OFFICE 2,625,790

ROTARY FLUID MACHINE ASSEMBLY

James Alexander Petrie, Littleover, England, assignor to Rolls-Royce Limited, Derby, England, a British company Application October 20, 1949, Serial No. 122,440
In Great Britain October 28, 1948

1 Claim. (Cl. 60—39.16)

The invention relates to fluid machine assemblies of the kind having a plurality of rotors mounted each on its own rotor shaft and each developing, when operating on or driven by the working fluid, an axial thrust which is related to the torque transmitted by its shaft.

Examples of such rotary fluid machines include turbines, compressors, fans and fluidscrews. Thus some axial flow turbines, when producing torque by the passage of fluid through their rotor blading, also have an axial thrust generated on the rotor disc or drum which is approximately proportional to the torque. Likewise, in the case of an axial flow compressor, fan or fluidscrew, the absorption of power thereby may be accompanied by an axial thrust on the rotor which again may be approximately proportional to the driving torque. In the case of single-sided radial flow machines a similar thrust may arise due to unbalance of pressure loadings on the two sides of the rotor. For example, in the case of a radial flow turbine or a single-sided centrifugal compressor the fluid pressure loading will differ as between the side of the rotor carrying moving blading or vanes and that which is subjected either to static inlet, exhaust or ambient pressure.

The object of the invention is to provide novel constructions of gas-turbine engines in which the various rotors can be independently located axially.

The invention may be more readily appreciated from the following description of a gas-turbine engine which embodies the invention, reference being had to the accompanying drawing which shows the gas-turbine engine, partly in section.

The drawing illustrates a construction of gas-turbine engine in which a high-pressure turbine-rotor 120 drives a high-pressure axial-flow compressor-rotor 121, and a low-pressure turbine-rotor 122 drives a low-pressure axial-flow compressor-rotor 123. Working fluid of the engine passes in series through the low-pressure compressor-rotor 123, high-pressure compressor-rotor 121, combustion equipment 124, high-pressure turbine-rotor 120, low-pressure turbine-rotor 122 and exhaust duct 125.

The turbine-rotor 122 is mounted on a shaft 126 which is nested within the shaft 127 on which the turbine-rotor 120 is mounted. Similarly the compressor-rotor 123 is mounted on a shaft 128 nested within the shaft 129 on which the compressor-rotor 121 is mounted.

In operation, an axial thrust is developed on each of the compressor-rotors tending to separate it from its associated turbine-rotor, and an axial thrust is developed on each of the turbine-rotors tending to separate it from its associated compressor-rotor.

The shaft of each compressor-rotor is connected to the shaft of the associated turbine-rotor by helical teeth. The shaft 129 is formed with external helical splined teeth 130 which co-operate with internal helical splined teeth 131 formed in the end of the shaft 127. The shaft 128 is formed with internal helical splined teeth 132 which cooperate with external helical splined teeth 133 on the end of the shaft 126.

The sense of the helices is chosen so that the lead of the teeth on each turbine shaft is in the same sense as the direction of rotation i. e. so that the axial thrusts developed in the shafts due to the transmission of driving torque from the turbine-rotors to the compressor-rotors through the helical teeth opposes the axial thrusts transmitted to the shafts by the rotors mounted on them, with the result that the thrust-bearing 140 locating the low-pressure compressor-rotor 123, the thrust-bearing 141 locating the high-pressure compressor-rotor 121, the thrust-bearing 142 locating the high-pressure turbine-rotor 120, and the thrust-bearing 143 locating the low-pressure turbine-rotor 122 can each have a smaller capacity than it would require if it had to transmit the whole of the axial thrust developed by its associated rotor in operation, from the rotor shaft to the supporting structure.

Similar arrangements can also be adopted in the case of marine propulsion systems where the thrust on the marine screw is forward in the sense of travel of the vessel, and the thrust on the turbine is rearward in that sense.

It will be seen that by appropriate selection of the helix angle, the reactions produced by the helices in their respective shafts may be arranged so that the loads in such shafts are substantially balanced, so that small capacity thrust bearings may be used.

It will be appreciated that in the interconnection of turbine and compressor or fluidscrew systems in accordance with the invention the thrust arising on the systems in operation is approximately proportional to the torque transmitted thereto or therefrom, and consequently throughout the designed range of running, the degree of balance afforded by the adoption of the invention will be maintained irrespective of the power transmitted.

The invention further permits the independent axial location of the various items of the assembly, which is of importance, in order to maintain efficiency of operation of these items, particularly in the case of axial flow compressors and turbines.

I claim:

A gas-turbine engine comprising a first compressor casing having an inlet and an outlet; a first compressor rotor in said first compressor casing, and whereon, when in operation, a first axial load is developed; a first compressor shaft whereon said first compressor rotor is mounted for rotation therewith, and to which said first axial load is transmitted; a second compressor casing having an inlet and an outlet; duct means from the outlet of said first compressor casing to the inlet of said second compressor casing; a second compressor rotor within said second compressor casing, coaxial with said first compressor rotor and whereon, when in operation, a second axial load is generated; a second compressor shaft whereon said second compressor rotor is mounted for rotation therewith and to which said second axial load is transmitted, said second compressor shaft being hollow and surrounding said first compressor shaft; a first turbine casing having an inlet and an outlet; duct means from the outlet of said second compressor casing to the inlet of said first turbine casing and including heating means; a first turbine-rotor in said first turbine casing, coaxial with said compressor rotors and whereon, when in operation, a third axial load is generated; a first turbine shaft whereon said first turbine rotor is mounted for rotation therewith, and to which said third axial load is transmitted, said first turbine shaft being hollow; a second turbine casing having an inlet and an outlet; duct means from the outlet of said first turbine casing to the inlet of said second turbine casing; a second turbine-rotor in said second turbine casing, coaxial with said first turbine-rotor and whereon, when in operation, a fourth axial load is generated; a second turbine shaft whereon said second turbine rotor is mounted for rotation therewith and to which said fourth axial load is transmitted, said second turbine shaft extending inside said first turbine shaft; a first pair of sets of interengaging helical splines, the one on said second compressor shaft and the other on said first turbine shaft, whereby torque can be transmitted from said first turbine shaft to said second compressor shaft and whereof the helix lead on said first turbine shaft is in the same sense as the direction of rotation so that when torque is so transmitted a fifth axial load is generated in said first turbine shaft opposing said third axial load; a second pair of sets of helical connections the one on said first compressor shaft and the other on said second turbine shaft, whereby torque can be transmitted from said second turbine shaft to said first compressor shaft, and whereof the helix lead on said second turbine shaft is in the same sense as the direction of rotation so that when torque is so transmitted a sixth axial load is generated in said second turbine shaft opposing said fourth axial load; a first locating thrust-bearing for said first compressor shaft; a second locating thrust-bearing for said second compressor shaft; a third locating thrust-bearing for said first turbine shaft; and a fourth locating thrust-bearing for said second turbine shaft.

JAMES ALEXANDER PETRIE.

REFERENCES CITED

The following references are of record in the file of this patent:

UNITED STATES PATENTS

| Number | Name | Date |
|---|---|---|
| 1,973,554 | Bentley | Sept. 11, 1934 |
| 2,174,806 | Soderberg | Oct. 3, 1939 |
| 2,375,006 | Larrecq | May 1, 1945 |
| 2,380,113 | Kuhns | July 10, 1945 |

FOREIGN PATENTS

| Number | Country | Date |
|---|---|---|
| 544,747 | Great Britain | Apr. 27, 1942 |
| 879,123 | France | Nov. 10, 1942 |